United States Patent [19]

Gyi et al.

[11] 4,146,911
[45] Mar. 27, 1979

[54] HEAD SPACING CONTROL

[75] Inventors: Ko K. Gyi; Herbert U. Ragle, both of Thousand Oaks, Calif.

[73] Assignee: Burroughs Corporation, Detroit, Mich.

[21] Appl. No.: 864,153

[22] Filed: Dec. 23, 1977

[51] Int. Cl.² .................. G11B 21/02; G11B 21/20; G11B 5/012
[52] U.S. Cl. ................................. 360/75; 360/109; 360/97
[58] Field of Search ................... 360/75, 97–99, 360/109, 105, 102–103

[56] References Cited

U.S. PATENT DOCUMENTS

| 3,183,516 | 5/1965 | Sliter | 360/75 |
| 3,614,579 | 10/1971 | Fulton | 360/75 |
| 3,632,900 | 1/1972 | Kurzweil, Jr. | 360/75 |
| 3,706,861 | 12/1972 | Giel | 360/75 |
| 3,974,524 | 8/1976 | Griffiths et al. | 360/75 |

Primary Examiner—Alfred H. Eddleman
Attorney, Agent, or Firm—John J. McCormack; Nathan Case; Kevin R. Peterson

[57] ABSTRACT

Embodiment illustrates technique for better controlling "head spacing" i.e., spacing of a magnetic transducer from the recording surface of a moving medium, such as a magnetic disk — this involving impressing signals on the recording surface (along a given track) at two prescribed frequencies, so that, upon detection of this signal, one frequency will be attenuated discriminatorily more than the other at all "erroneous" head spacings whereby a "null-seeking" servo control and associated head elevation system may be monitored to maintain optimum head spacing, (e.g., where two frequencies detected at same amplitude). Better control of head/-medium spacing in non-contact magnetic recording systems is achieved, especially where one signal is a very high frequency signal which is significantly attenuated whenever there is significant spacing error, while it is readily detected at the proper spacing; while the other signal is relatively unaffected by head spacing.

11 Claims, 3 Drawing Figures

HEAD SPACING CONTROL

BACKGROUND OF INVENTION

This invention relates to magnetic recording systems, and especially those of the type used principally with computer systems for data storage. The invention is particularly apt for improvements in controlling the spacing of a magnetic head flying above the surface of a magnetic medium, doing so simply according to the detected relative strengths of signals of varying frequency on the medium.

Workers in the art of magnetic recording are aware of recording equipment and techniques intended to improve the density and accuracy of recording and/or detecting of digital data; especially as applied to magnetic disk memory files as adapted for buffer data storage with computer equipment. Such files typically involve magnetic transducers "flown" a few u-in. (microinches) above the recording surface of a magnetic disk. The heads commonly used for this comprise a set of transducer cores whose recording faces are fashioned very carefully to a precise profile which is optimum for the aerodynamics involved.

More particularly, such heads are typically supported very closely adjacent the disk surface on a fluid film (air bearing) developed by the rapid relative translation of the disk surface. The air bearing is understood as formed by a thin film of air swept into the head/disk gap and developing sufficient pressure to maintain the head at a prescribed distance — this being herewith known as head/disk spacing ($d_h$). Typically, this separation $d_h$ is on the order of only several dozen microinches or less.

As workers are aware it is becoming more and more critical to maintain this intimate head spacing, especially as bit densities increase, as disk speeds increase, and as the recording films become thinner and thinner, with adequate signal strength becoming more and more critical. Of course, it is catastrophic for such a flying head to "crash" onto the passing disk; this must be prevented at all costs. It is equally important to assure that this head spacing hd (which is critical for predictable read/write functions) is precisely maintained — since, for instance, a loss of signal strength resulting from hd variance may distort or lose magnetic information and compromise the entire memory system. The mechanical performance of such a flying head is a function of this head spacing, or flying height. Workers will recognize, in short, that head spacing is a most critical factor in assuring accurate recording and detection of magnetic information.

Moreover, head spacing systems are becoming relatively more sophisticated and it is becoming ever more important to control the rate and angle at which a head approaches a rotating disk surface (e.g., when the air bearing effect is first established) — not only to prevent a "crash", but to accelerate head actuation and foreshorten access time. Conversely speed is equally important when retracting the head from a disk. Workers will recognize that any time lost in this operation amplifies "access time"; a factor which is becoming more and more critical. Some actuation systems are presently contemplated which control the "landing and take-off" of such a flying head in a manner quite similar to that exercised in flying aircraft. It is an object of this invention to provide improved control of head spacing with a system simply involving signals recorded on the media at two key frequencies and detected and combined so as to be optimized only at a proper nominal spacing.

The foregoing and other features and advantages of the invention will be better understood and appreciated by reference to the following detailed description of the preferred embodiments of the invention, considered in connection with the accompanying drawings wherein like reference symbols denote like parts:

DESCRIPTION OF THE PREFERRED EMBODIMENT

Figure 1:
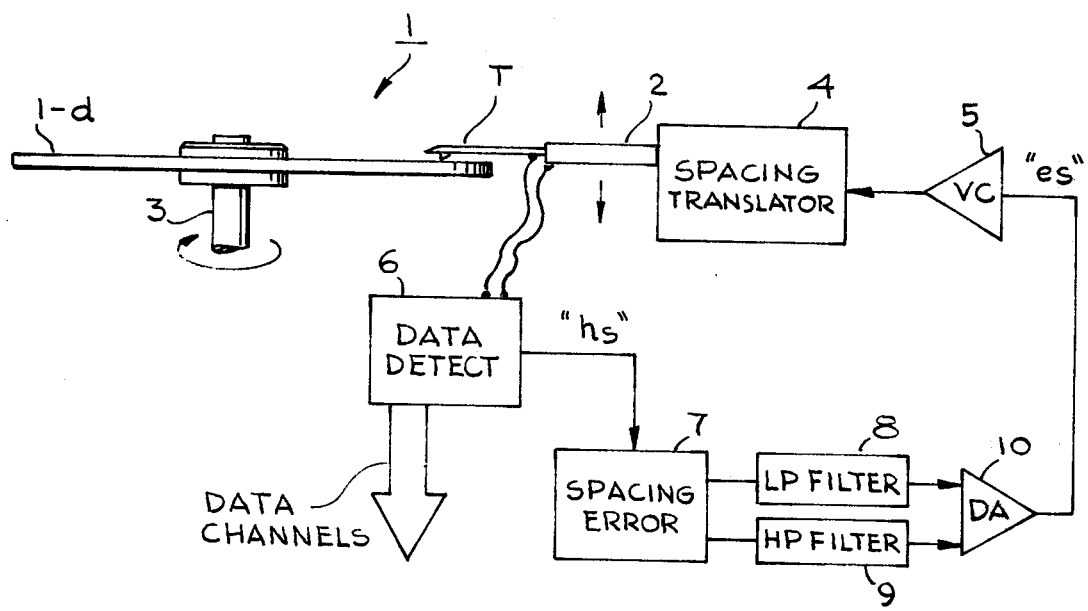
FIG. 1 is a schematic block diagram of a head spacing control system according to one embodiment of the invention.

Referring now to FIG. 1, a magnetic disk pack 1 is shown very schematically as adapted to be controlled for head spacing according to a preferred embodiment of the invention. "Spacing error" data will be understood as detected from portions of the magnetic disk record itself and applied through a difference amplifying stage to develop a prescribed "spacing error signal", adapted to control a related spacing actuator arrangement. These and other elements discussed herein will be understood by those skilled in the art as conventionally constructed and operated except where otherwise stated.

Thus, a conventional disk pack 1 will be understood as represented by an illustrative disk 1-d, mounted upon a spindle 3 for prescribed rotation relative to a magnetic transducer array T as known in the art. Transducer array T will be understood as mounted, in turn, upon an access arm 2 with spacing translator means 4, (not illustrated but within contemplation of workers in the art), adapted, under the proper controls as discussed below, to position the transducer cores (on one or both sides of record 1-d) toward and away from the disk surface.

Other conventional associated equipment (such as a servo arrangement adapted to position the transducers on a prescribed track and maintain them centered there) is not shown but will be understood as conventionally provided. Conventional compatible variations on the described embodiment will also be understood — e.g., translator 4 may position an array of head arms (e.g., one for each disk).

From each head assembly, electrical connection is made to conventional electric circuits in a detection system 6 for deriving electrical information from the transduction of data magnetically recorded on the disk tracks as known in the art. From system 6 a "data channel" will be conventionally derived, as well as other signals including the usual servo position signals (not shown) and head spacing signals "hs" applied as indicated to spacing error stage 7 where they are processed and distributed as workers will understand. The output of stage 7, in turn, and according to a preferred feature of invention is applied to a pair of low-pass/high pass filters (8,9, respectively) as further discussed below. The output from each filter is selectively applied, in turn, to a difference amplifier stage 10, the output signal (es) from which is supplied to control the spacing translator stage 4, via a driver amplifier 5. The translation actuator preferably comprises a voice-coil actuator constructed and operated as known in the art and not further discussed here.

Figure 2:
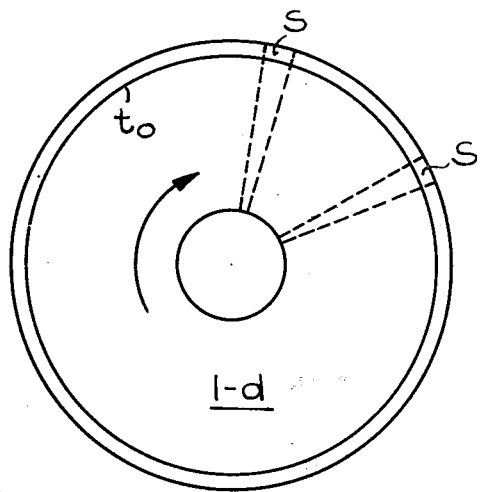
FIG. 2 is an upper perspective view of a magnetic disk record very schematically shown.
Figure 3:
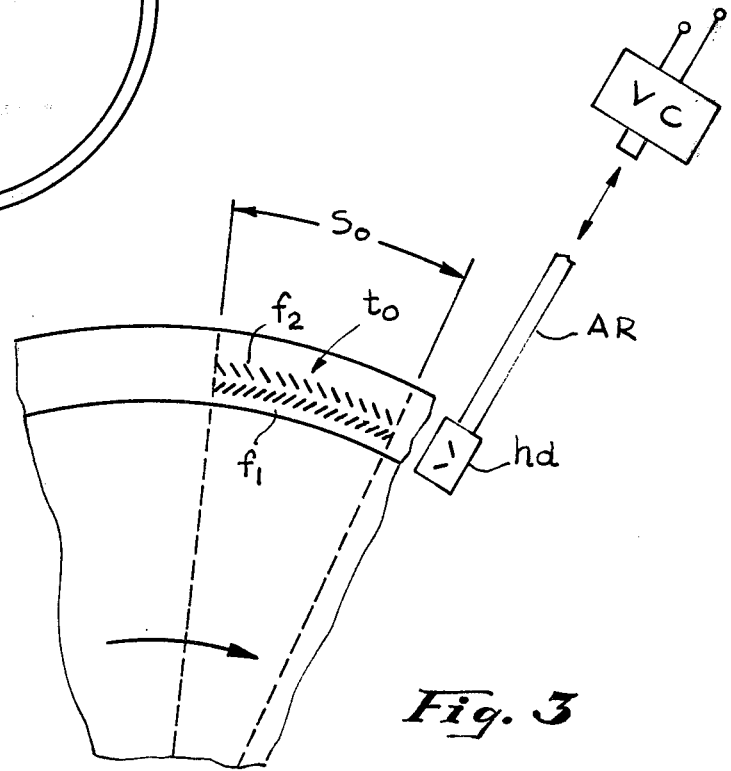
FIG. 3 shows an enlarged fragment thereof with head spacing signals schematically illustrated thereon according to an embodiment of the invention.

More particularly, and as indicated in some detail in FIGS. 2 and 3, each disk 1-d is typically provided with a number of concentric tracks, such as illustrative track $T_o$, each track having a number of prescribed servo sectors S distributed therealong as known in the art. According to a preferred feature of this embodiment, however, at least a portion of these track sections is provided with information recorded at two frequencies $f_1$, $f_2$ adapted to generate head spacing control signals as further discussed below.

That is, for example, as shown in FIG. 3 in an illustrative sector portion $S_o$ of sample track $T_o$, a prescribed high frequency signal $f_1$ and an associated low frequency signal $f_2$ are provided in parallel adjacency and adapted to be detected by a prescribed transducer head hd when properly centered over the track.

Head hd will be understood as mounted conventionally on arm AR for coupling to a head spacing (voice-coil) arrangement VC adapted to adjust the head spacing distance using known techniques. Head hd, preferably comprises a pair of orthogonal transducer cores, each core being adapted to detect one sub-track of signal frequencies, $f_1$ or $f_2$. A preferred technique for this detection is described in copending U.S. Ser. No. 807,155, filed June 16, 1977 and entitled "Improved 'Track-on-Data' Technique and Associated System", by Herbert U. Ragle and Norman S. Blessum, and in related copending U.S. Ser. No. 820,868, filed Aug. 1, 1977 and entitled "Improved Di-Bit Recording Technique and Associated System", by Herbert U. Ragle and Norman S. Blessum, both applications being incorporated herein by reference. A conventional inductive (or other like) head will be assumed here, having a record-confronting face which cooperates, conventionally, with the passing record surface to form the well-known "air-bearing" effect.

Of course, the foregoing arrangement may be used in conjunction with the control system of FIG. 1, or alternatively with other control systems contemplated by those skilled in the art and providing essentially the same head spacing control function. For instance, each core in head hd may furnish a separate channel of head spacing information to difference amplifier 10 in FIG. 1 via an automatic switch which assures that the spacing signals are applied only at times when head spacing control is desired.

The above indicated preferred embodiment involves a novel head spacing control arrangement adapted to operate according to a preferred feature hereof, in a "track-on-data" mode (FIG. 3) — something workers will recognize as highly desirable for obtaining a maximum recording density and minimum track widths. Such techniques, and the improved accuracy in head spacing control associated, are particularly desirable for use with flexible disk recording systems and other "out of contact" magnetic recording arrangements as workers will recognize. The plastic properties of such flexible media (e.g., magnetic tape is similar to a floppy disk in some respects) cause certain surface deformations in the passing record segment that cannot be compensated for adequately in the design or operation of the typical air film head system. Thus, to maintain a constant head/medium spacing it is necessary to change the head loading quickly and on a continuous basis. This may be accomplished as workers recognize with a voice-coil positioner system as indicated above.

This spacing error information is, as mentioned, preferably derived from a differential comparison of signal amplitude. This information as indicated in FIG. 3 is preferably derived, according to a preferred feature, from the "sector preamble" — and according to one embodiment will consist of comparing amplitudes of a "double frequency burst".

Now, a maximum amplitude output signal will be detected when the head face is in contact with the recording medium, and as the head spacing increases the amplitude of this detected signal falls off radically. As the head-media spacing increases, the higher frequency signal will be discriminatorily attenuated more than the lower frequency. This difference is used to generate error signal "es" (FIG. 1) to be applied to the voice-coil positioner system which will, responsively, position the head closer to the medium (e.g., to within 10–50 u-in) until the error signal is essentially reduced to zero, as known in the art. More particularly:

AMPLITUDE RATIO-ING FOR HEAD-SPACING CONTROL where
$A_1, A_2$ = signal amplitude for $f_1$, $f_2$  (1)
$A_{01}, A_{02}$ = signal output, in contact, for $f_1$, $f_2$
$d$ = spacing distance
$\lambda_1, \lambda_2$ = recording wavelength (reflecting $f_1$, $f_2$)

It is postulated that "spacing error" SE = d Actual ± d-Required.  (2)

It is found that spacing (d) may be expressed as a function of signal amplitude and wavelength as follows:

$$d = \log \frac{A_1}{A_2} - \frac{A_{02}}{A_{01}} \, 2\pi[1/\lambda_2 - 1/\lambda_1] \quad (3)$$

It will be assumed, of course, that under the foregoing conditions, read-signal amplitude falls off exponentially with increasing head spacing $d_h$. Now, the absolute head spacing $d_h'$ cannot, of course, be computed in terms of amplitude $A_1$ unless the in-contact amplitude $A_0$ has been determined — something not usually practical in systems of the described kind. However, with all of the conditions remaining constant, amplitudes $A_1$, $A_2$ (and their ratio), as indicated above, may be detected (and assuming that frequency and wavelength remain constant the while) — and the spacing error, if any, computed in terms of these two amplitudes with no need to determine "contact amplitude" $A_0$.

Of course, the foregoing also assumes that certain other factors affecting signal amplitude remain constant, such as magnetic characteristics of the media and transducer (e.g., film coercivity, gap length, etc.). Using the preferred "track-on-data" technique will eliminate concern over variations, in time or space, of the magnetic characteristics of the transducer or the medium.

In operation, workers will recognize that the above indicated recording of signals $f_1$, $f_2$ (see $_1$, $_2$) and the subsequent detection thereof and derivation of spacing control signals are relatively straightforward and may be carried out as known in the art. For instance, preferably, recording will be performed at relatively small head-spacing values (on the order of 10–15 microinches) and at relatively slow disk rpm, with the readback signal varying rather directly with head spacing $d_h$. Various means may be employed to minimize the effects of spacing upon the writing process and thus render recorded frequency independent of disk speed while writing relatively "close" to the record as known in the art — i.e., one need not specially control disk rpm to maintain recorded frequency constant.

Also, various modifications of the foregoing may be practiced as recognized in the art. For instance, further recorded wavelengths ($f_3$, $f_4$, $f_n$, etc.) and associated detection-control means may be invoked.

Moreover, the system may also be used for monitoring spacing variations across the transducing surface of a head (e.g., pitch and roll variations, or distortion in head face) as workers in the art will realize. Also, conventional detection techniques will be acceptable reflecting the simplicity and attractiveness of the subject technique. For instance, amplitude may be detected for each individual signal or as an "amplitude envelope", in conventional ways, presently known in the art.

Workers will perceive other alternative ways of using the invention and/or employing different, but similar, methods and means to achieve similar results. Thus, it will be understood that the preferred embodiments described herein are only exemplary, with the invention being capable of many modifications and variations in structure, arrangement and application of the invention without departing from its spirit. And, the above examples are merely illustrative, with the invention being understood as including all possible modifications and variations coming within the ambit of the following appended claims.

What is claimed is:

1. In an improved magnetic disk storage system, the combination comprising at least one read-write transducer assembly; associated disk memory means including at least one record disk; head spacing means adapted to adjust the height of the transducer face at a prescribed "nominal spacing" from the disk record;

said transducer assembly being adapted to impress various indicia upon said record disk, this including data indicia, first spacing indicia and second spacing indicia and also to detect this indicia to produce data readout, first spacing readout and second spacing readout, respectively, whereby significant variations in transducer height from said "nominal spacing" will preferentially affect the amplitude of said first spacing readout significantly more than that of said second spacing readout; and associated spacing control means adapted to develop a head position error signal from said first and second spacing readouts, said control means including servo error control means for developing actuator control signals from said error signals according to a prescribed shift in relative amplitude between said spacing readouts.

2. The combination as recited in claim 1, wherein said error control means is adapted to develop error signals from recordings impressed upon said recording surface at a prescribed first and second frequency and wherein said control means includes a pair of filters and associated difference amplifier means arranged to difference the filter outputs.

3. The combination as recited in claim 2, wherein said spacing signals are arranged and selected so as to be characterized by either a first signal recorded at a prescribed relatively high frequency selected to be significantly attenuated at head spacings beyond said "nominal spacing", and by a said second signal recorded at a relatively lower frequency; and wherein one said filter means is adapted to pass only said relatively high frequencies and the other said relatively lower frequencies.

4. An improved out-of-contact magnetic recording arrangement adapted to control head-record spacing for recordings including prescribed special head-spacing signals at respective first and second frequencies, this arrangement including:

positioning means adapted to rapidly and continuously reposition said head at prescribed "nominal spacing" relative to an associated surface; and control means adapted to receive data signals representative of the transduction of the said two recorded frequencies and, processing these, to also develop a spacing error signal and apply this to said positioning means for controlling head position so as to follow said "nominal spacing".

5. The combination comprising:

rotatable recording disk means including at least one recording surface;

a plurality of transducer means adapted to be adjustably spaced relative to said recording surface and to operate at a prescribed "nominal spacing" therefrom for optimal recording and detection of prescribed data signals;

Read/Write means for developing Read and Write signals in association with said transducer means;

rotation means for rotating said disk in a prescribed manner;

spacing-control means for applying cyclically varying write-signals of two prescribed wavelengths $\lambda_1$, $\lambda_2$ to said transducer means while said disk means is rotating;

detection means for developing prescribed spacing signals of respective amplitudes $A_1$, $A_2$ from said disk reflecting the detection of said respective signals $\lambda_1$, $\lambda_2$ recorded thereon;

head spacing means adapted to automatically space the transducer means said nominal spacing from the recording surface; and head-spacing-control means adapted to receive said detected spacing signals and to develop a spacing position error signal therefrom and to apply it to said head-spacing means whereby to reposition said heads relative to said recording surface until said "nominal spacing" is achieved and to thereafter maintain this spacing.

6. An improved method for automatically controlling the spacing of a magnetic transducer from a magnetic recording surface out-of-contact therewith so as to maintain a prescribed "nominal spacing", this method comprising:

recording magnetic spacing signals of first and second known wavelengths $\lambda_1$, $\lambda_2$ on said recording surface;

effecting a first rough spacing of said recording face from said recording surface;

detecting the amplitude $A_1$, $A_2$; of said respective signals;

comparing these signal amplitudes and developing a position error signal therefrom;

and applying said position error signal to head-spacing means to effect said nominal head-spacing.

7. The combination as recited in claim 6, wherein said spacing signals are recorded on at least a portion of the data tracks along said surface and said associated detecting thereof effects a track-on-data, spacing-a-data positioning mode.

8. The combination as recited in claim 7, wherein said detecting is effectly with the data transducing system.

9. The combination as recited in claim 8, wherein said first wavelength $\lambda_1$ is selected to indicate farther than "nominal" spacing according to reduction in detected amplitude $A_1$ thereof, while the second wavelength $\lambda_2$ is selected to maintain a relatively constant amplitude $A_2$ despite such variations from nominal spacing.

10. The combination as recited in claim 9, wherein said position error signal is developed by filtering said spacing signals to segregate each frequency output into a separate channel and differencing these channels.

11. An improved method for automatically controlling head spacing means adapted to adjust the spacing of a magnetic transducer from a magnetic recording surface out-of-contact therewith so as to maintain a prescribed "nominal head height", this method operating according to a "space-on-data" principle and comprising:

recording first and second types of magnetic spacing bits on said recording surface such as to produce a prescribed respective first and second spacing readout and so that contemplated spacing-error variations from said "nominal head height" will change said first spacing readout significantly more than the second spacing readout;

disposing said transducer approximately at said "nominal head height" above said recording surface and detecting said first and second spacing bits to derive said respective first and second readout signals;

comparing the amplitude of these readout signals and developing a position-error signal therefrom; and applying this position-error signal to said head spacing means to adjust the transducer head height to be closer to said "nominal" head spacing.

* * * * *